United States Patent [19]

Mensah et al.

[11] Patent Number: 4,692,615

[45] Date of Patent: Sep. 8, 1987

[54] APPARATUS AND METHOD FOR MONITORING TENSION IN A MOVING FIBER BY FOURIER TRANSFORM ANALYSIS

[75] Inventors: Thomas O. Mensah, Big Flats; Dale R. Powers, Painted Post; Clement D. Burton, Ithaca, all of N.Y.

[73] Assignee: Corning Glass Works, Corning, N.Y.

[21] Appl. No.: 806,750

[22] Filed: Dec. 9, 1985

[51] Int. Cl.⁴ ............................................. G01D 5/34
[52] U.S. Cl. ................................. 250/231 R; 73/160; 73/862.41; 250/559
[58] Field of Search .................... 250/559, 571, 231 R, 250/560, 561; 73/657, 862.41, 862.39, 160; 242/148

[56] References Cited

U.S. PATENT DOCUMENTS

4,294,545 10/1981 Stutz .................................... 250/560
4,393,725 7/1983 Satterfield ....................... 73/862.41

Primary Examiner—Edward P. Westin
Assistant Examiner—Jessica L. Ruoff
Attorney, Agent, or Firm—M. M. Klee; W. S. Zebrowski

[57] ABSTRACT

A non-contact system for monitoring the tension in an optical waveguide fiber during drawing is provided. The system comprises: (a) means for sensing the motion of the fiber in a direction transverse to the direction in which the fiber is moving; (b) means for analyzing the sensed motion to determine at least one frequency component thereof; and (c) means for monitoring the frequency component so determined so as to monitor the tension in the fiber.

16 Claims, 8 Drawing Figures

—△— FREQUENCY METHOD
□  CONTACT METHOD

FIG. 5.

SEC

APPARATUS AND METHOD FOR MONITORING TENSION IN A MOVING FIBER BY FOURIER TRANSFORM ANALYSIS

BACKGROUND OF THE INVENTION

1. Field of the Invention

This invention relates to optical waveguide fibers and, in particular, to a method and apparatus for monitoring fiber tension during the drawing of such fibers.

2. Description of the Prior Art

As is well known in the art, a critical parameter in the production of optical waveguide fibers is the tension within the fiber during the drawing process, and, in particular, the tension within the fiber in the region between the hot zone and the first coater. The magnitude of this tension affects the final properties of the fiber, including the fiber's diameter, ultimate strength and, through a stress optic effect, its optical properties.

From a process point of view, the tension in the fiber also affects the overall stability and throughput of the drawing process. Excessive tension leads to rapid necking and ultimate rupture of the fiber in the hot zone region. If not carefully controlled, increasing the temperature of the hot zone to reduce fiber tension can result in draw resonance and root oscillation, which in turn can result in oscillatory variations in fiber diameter which are difficult to control with conventional fiber diameter monitoring equipment. Oscillation of the fiber during drawing can also adversely affect the fiber coating process.

To date, fiber tension has been monitored mechanically by measuring the deformation of the fiber in response to a force applied transversely to the direction of motion of the fiber. Specifically, a three wheel device has been used wherein two wheels are applied to one side of the fiber and a third wheel is applied to the other side of the fiber. The third wheel is lightly sprung and can move in and out relative to the first two wheels. The location of the third wheel relative to the first two wheels has been used as a measure of the tension in the fiber.

The three wheel approach has numerous disadvantages which arise from the fact that the approach involves physically contacting the moving fiber. One such disadvantage results from the fact that it is difficult to precisely align the device with the fiber so as not to change the original path of the fiber. Even slight changes in fiber path can have a significant effect on the overall drawing process. For example, as described below, it has been found that contact of the three wheel device with the fiber will affect the on-line fiber diameter feedback loop so as to reduce fiber draw speed. Probably the most serious disadvantage of physically contacting the moving fiber, however, is breakage of the fiber. Because of this problem, the three wheel approach has generally only been used for monitoring fiber tension at draw speeds below about 5 meters/second.

SUMMARY OF THE INVENTION

In view of the foregoing state of the art, it is evident that an improved method and apparatus for monitoring fiber tension during the drawing of optical waveguide fibers is needed. It is the object of the present invention to provide such an improved monitoring system.

More specifically, it is an object of this invention to provide a non-contact system for monitoring fiber tension wherein there is no risk that the fiber will be broken by the measuring process. It is an additional object of the invention to provide a fiber tension monitoring system wherein the measuring process does not alter the existing tension in the fiber. It is a further object of the invention to provide a system which can be used to monitor fiber tension in an on-line, continuous manner. It is an additional object of the invention to provide a system which can be conveniently used to monitor fiber tension in the region between the hot zone and the first coater. It is another object of the invention to provide a system which can be used to monitor the tension of optical waveguide fibers being drawn at all speeds including speeds greater than 5 meters/second.

To achieve the foregoing and other objects, the invention in accordance with certain of its aspects provides a method for monitoring the tension in a moving fiber comprising the steps of:

(a) sensing the motion of the fiber in a direction transverse to the direction in which the fiber is moving;

(b) analyzing the sensed motion to determine at least one frequency component thereof; and (c) monitoring the frequency component so determined so as to monitor the tension in the fiber.

In accordance with certain preferred embodiments of the invention, the motion of the fiber is sensed optically by illuminating the fiber and sensing the location of its shadow as a function of time. In other preferred embodiments of the invention, a Fourier transform is used to analyze the sensed motion of the fiber.

In accordance with other aspects of the invention, apparatus for practicing the foregoing methods for monitoring fiber tension are provided.

The accompanying drawings, which are incorporated in and constitute part of the specification, illustrate the preferred embodiments of the invention, and together with the description, serve to explain the principles of the invention.

DESCRIPTION OF THE PREFERRED EMBODIMENTS

As discussed above, the present invention relates to a method and apparatus for monitoring the tension in a moving fiber by: (1) sensing the motion of the fiber; (2) analyzing that motion to determine at least one of its frequency components; and (3) monitoring the frequency component or components so determined so as to monitor the tension in the fiber.

In accordance with the invention, it has been found that at least to a first approximation, the vibrational behavior of an optical waveguide fiber during drawing corresponds to the vibrational behavior of a string under tension which has been fixed at both ends. As is known in the art, the equation of motion for such a string is:

$$\frac{\partial^2 S}{\partial t^2} = (T/\mu)\frac{\partial^2 S}{\partial x^2} \qquad \text{Eq. 1}$$

where the x-axis is coincident with the equilibrium position of the string, x is the distance along the x-axis, S is the transverse displacement of the string from the x-axis, t is time, $\mu$ is the mass per unit length of the string, and T is the tension in the string. The general solution of this equation for an arbitrary driving force and arbitrary initial conditions can be written as a sum of harmonics having the frequencies:

$$\nu_n = (n/2L) \cdot (T/\mu)^{\frac{1}{2}} \qquad \text{Eq. 2}$$

where $\nu_n$ is the frequency of the nth harmonic and L is the length of the string. In particular, the first harmonic (fundamental frequency) of the string's motion is given by:

$$\nu_1 = (\tfrac{1}{2}L) \cdot (T/\mu)^{\frac{1}{2}} \qquad \text{Eq. 3}$$

As demonstrated in detail below, it has been found that the transverse motion of an optical waveguide fiber during drawing can be broken up into a series of harmonics and that at least to a first approximation, the frequency of the first harmonic of that series is related to the tension in the fiber in accordance with the relationship given in Eq. 3.

The relationship between the sensed or observed frequency and the tension in the fiber is only approximate for a variety of reasons. For example, during drawing, the fiber is not actually rigidly clamped at both ends, but is damped by viscous flow in the hot zone and in the coater. Similarly, the diameter of the fiber varies significantly in the region of the root of the preform thus producing a non-constant mass per unit length at the top end of the fiber.

Both of these factors would be expected to lead to a reduction in the sensed or observed frequency of the first harmonic. Accordingly, the tension calculated from Eq. 3 would be expected to be lower than the actual tension in the fiber. However, as the results reported below show, in practice, these effects have been found not to lead to significant errors in the calculated value of tension.

Moreover, in all cases, it has been found that changes in the frequency of the first harmonic, as well as in the frequencies of higher harmonics, monotonically correspond to changes in the fiber's tension. Accordingly, in all cases, the frequencies exhibited by the fiber can be used to monitor the tension in the fiber, even if an exact value for the tension cannot in all cases be calculated from those frequencies.

In the various embodiments of the invention described in the following examples, the transverse motion of the fiber is sensed or observed by illuminating the fiber with a laser beam and recording the location of the fiber's shadow as a function of time on a linear array of photodiodes. A spectrum analyzer which performs a fast Fourier transform is then used to convert the time domain data obtained from the photodiodes to frequency domain data. It is to be understood, of course, that other methods and types of equipment for sensing or observing fiber position and other analysis techniques can be used in the practice of the present invention.

EXAMPLE 1

Apparatus for Sensing the Transverse Motion of a Fiber and for Determining The Harmonic Components of that Motion This example describes apparatus for sensing the transverse motion of a fiber and for determining the harmonic components of that motion.

Conceptually, the apparatus can be divided into three sections: an optical section, an electronics section, and an analysis section. The optical section creates an image of the fiber on a detector. The electronics section converts the optical image to a voltage proportional to the position of the fiber. The analysis section converts the position data to a set of frequency components using Fourier transform techniques.

Figure 1:
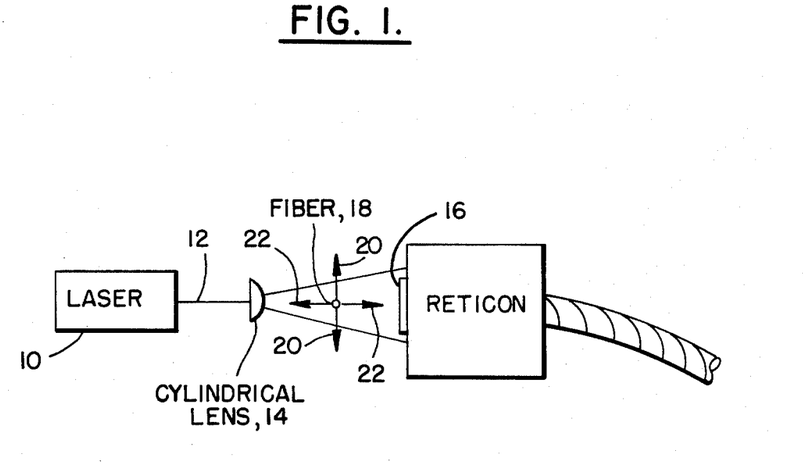
FIG. 1 is a schematic diagram of the optical section of a preferred embodiment of the apparatus of the present invention.

FIG. 1 shows the overall arrangement of the optical section of the apparatus. Laser 10 produces laser beam 12 which passes through cylindrical lens 14 and onto linear photodiode array 16. The long axis of photodiode array 16 lies in the plane of FIG. 1.

Optical waveguide fiber 18, whose direction of travel during drawing would be perpendicular to the plane of FIG. 1, blocks part of the laser beam and thus creates a shadow of itself on the photodiode array. In addition to moving perpendicular to the plane of FIG. 1, fiber 18 also has motion in the plane of FIG. 1. Such motion is the transverse vibrational motion whose frequency components are to be determined. The transverse motion originates either from the drawing process itself, or, if that process happens to be particularly vibration free, the fiber can be intentionally given transverse motion by, for example, periodically blowing on the fiber with compressed air.

The transverse motion is illustrated schematically in FIG. 1 by arrows 20 and 22. Motion in the direction of arrows 20 changes the location of the shadow of fiber 18 on photodiode array 16. This moving shadow is ultimately converted into the desired frequency spectrum by the electronics and analysis sections of the apparatus.

In practice, it has been found convenient to use a 5 milliwatt HeNe laser as the light source and a RETICON RL1728H line scanner (Reticon Corporation, Sunnyvale, Calif.) as the linear photodiode arrray. The RETICON scanner includes 1728 photodiodes evenly spaced over a length of one inch so that each photodiode is separated from its neighbor by 0.6 mils. Accordingly, with this device, the fiber's position can be determined to within this level of resolution.

The RETICON device is self-scanning and outputs a string of voltage levels, each of which corresponds to the light intensity striking one of the diodes in the array. Scanning and outputting are under the control of the RETICON's internal one megahertz clock.

The electronics section of the apparatus takes the output string from the RETICON and converts it to a voltage proportional to the position of the fiber in space. To do this, a timer is turned on at the beginning of each scan of the RETICON array. The edge of the shadow of the fiber is used to turn off the timer. The accumulated time is proportional to the number of diodes from the edge of the array to the edge of the fiber's shadow. Preferably, the timer uses the RETICON's internal clock as its time base so that the accumulated time becomes equal to the number of diodes scanned from the end of the array, independent of any variations which may occur in the rate at which the array is scanned.

Figure 2:
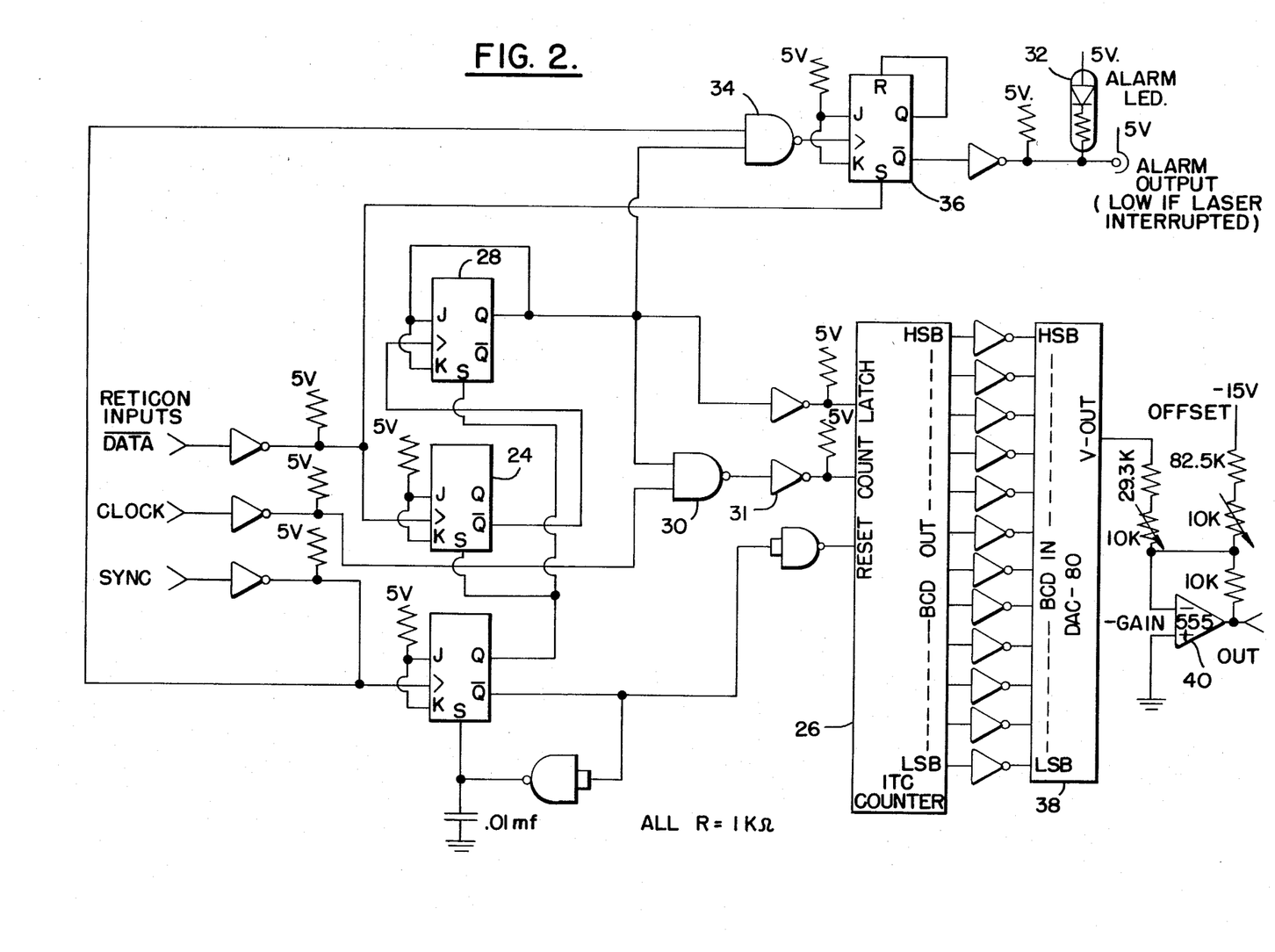
FIG. 2 is a schematic diagram of the electronics section of a preferred embodiment of the apparatus of the present invention.
Figure 3:
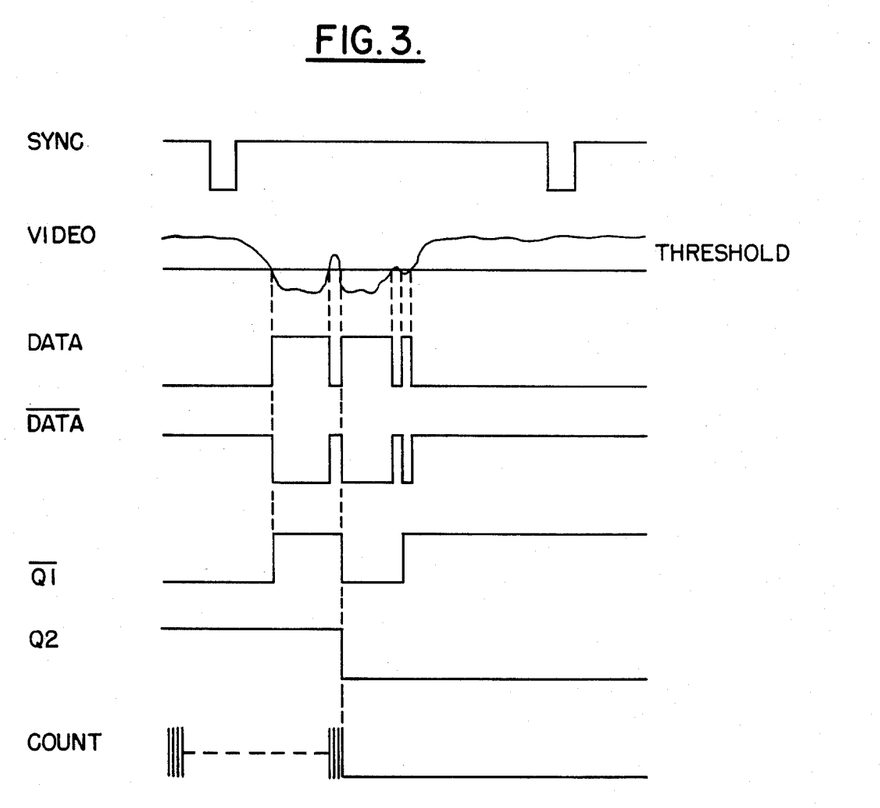
FIG. 3 shows the input waveforms and certain of the intermediate waveforms produced by the electronics section of FIG. 2.

FIG. 2 shows a specific electronics section which has been used to convert the output of a RETICON scanner into position versus time data suitable for inputting into a spectrum analyzer. FIG. 3 shows the wave forms produced by the RETICON and by JK flip-flops 24 and 28 in FIG. 2.

A typical RETICON pulse string produced by one scan of the diode array appears as the "VIDEO" tracing in FIG. 3. In addition to this form of output, the RETICON also outputs digital signals derived from the VIDEO signal. These digital signals are illustrated by the "DATA" and "NOT DATA" tracings in FIG. 3.

The conversion from the VIDEO signal to the digital signals is done by means of a user adjustable threshold voltage, wherein for any video level lower than the threshold, DATA is set to five volts, and for any VIDEO signal higher than the threshold, DATA is set to zero volts. This assignment of voltages means that the DATA signal is inverted from the VIDEO signal. In this way, the state of the DATA signal corresponds to the light levels at the diodes, since for a RETICON device, higher light levels produce smaller VIDEO signals.

In addition to the VIDEO, DATA, and NOT DATA outputs, the RETICON also outputs a SYNC signal which drops low each time the RETICON prepares to begin another sweep of the diodes. The electronics section shown in FIG. 2 uses the SYNC and NOT DATA outputs of the RETICON, as well as the RETICON's internal clock signal, to generate the position versus time data which is supplied to the spectrum analyzer.

The operating rationale of the electronics section is as follows. The position of the fiber is to be determined by means of totalizing counter 26 in FIG. 2. To do so, a waveform which changes state at the beginning of an array scan and at the edge of the shadow is required. Due to the noisy edges often associated with expanded laser spots, the waveform should also prevent the counter from being reset before the end of a scan.

In FIG. 2, a pair of JK flip-flops 24 and 28 are used to develop the desired waveform. SYNC is used to reset both flip-flops. NOT DATA is fed into the clock of JK flip-flop 24. As a result, this flip-flop produces the output waveform NOT Q1 shown in FIG. 3. NOT Q1, in turn, is fed into the clock of flip-flop 28. Both J and K of this flip-flop are tied to the Q output of the flip-flop resulting in the waveform Q2 in FIG. 3. By combining the CLOCK input from the RETICON and Q2 from flip-flop 28 into NAND gate 30 and then into inverter 31, the desired waveform (COUNT in FIG. 3) is produced. As will be understood, NAND gate 30 and inverter 31 produce an AND gate effect.

COUNT is fed into the clock input of totalizing counter 26. With SYNC fed into the reset, the counter will total the number of diodes from the edge of the array (SYNC) to the edge of the shadow of the fiber. So that counter 26 does not produce a ramp-shaped output voltage as it totalizes the incoming counts, a counter with a latch is used and Q2 is fed into the latch. Because of the latch, although the counter is counting, it does not update its output until a low pulse is received on the latch input. Since Q2 goes low only after the maximum count is reached, the counter will only output the total number of counts, not the ramp leading to the total.

The circuit shown in FIG. 2 also includes an alarm circuit which activates LED 32 when the laser beam is interrupted. This circuit includes NAND gate 34 and JK flip-flop 36. The output of the NAND gate is the clock input to the flip-flop. The NAND gate combines Q2 and NOT SYNC. Accordingly, the output of the NAND gate will be high unless Q2 and NOT SYNC both go high together. Under normal conditions Q2 will always be low at the end of a sweep, so that no clock input will be produced by the NAND gate, and the flip-flop will not change state. If the laser is off, Q2 will remain high for the whole sweep, and the flip-flop will change states when NOT SYNC goes high. Because Q for this flip-flop is attached to R (reset), the flip-flop will remain in its alarm state until NOT DATA goes low (i.e., when the laser comes back on) which will set the flip-flop to its non-alarm state because set overrides reset.

Totalizing counter 26 outputs a digital (BCD) number equal to the number of diodes from the edge of the detector to the edge of the shadow. To convert this number to an analog voltage suitable for inputing to the analysis section of the apparatus, the output of the counter is fed through DAC-80 D/A converter 38. The output of the D/A converter is amplified and offset using op-amp 40 and then fed directly to a Model 444A mini-ubiquitous FFT computing spectrum analyzer manufactured by Nicolet Scientific Corporation of Madison, Wis.

The spectrum analyzer performs a fast Fourier transform on the output from the electronics section to transform that data from the space domain to the frequency domain. The output of the spectrum analyzer is: (1) a list of the frequencies making up the position versus time tracing; and (2) the relative contribution of each frequency to that tracing. As described below in Examples 2 and 3, in accordance with the invention, this frequency information is used to monitor the tension in the fiber.

EXAMPLE 2

Measurement of Tension in a Stationary Optical Waveguide Fiber

This example reports the results of a series of experiments which were performed on a stationary optical waveguide fiber to establish that harmonic analysis of the transverse vibrational motion of a fiber can be used to monitor the tension in the fiber.

Figure 4:
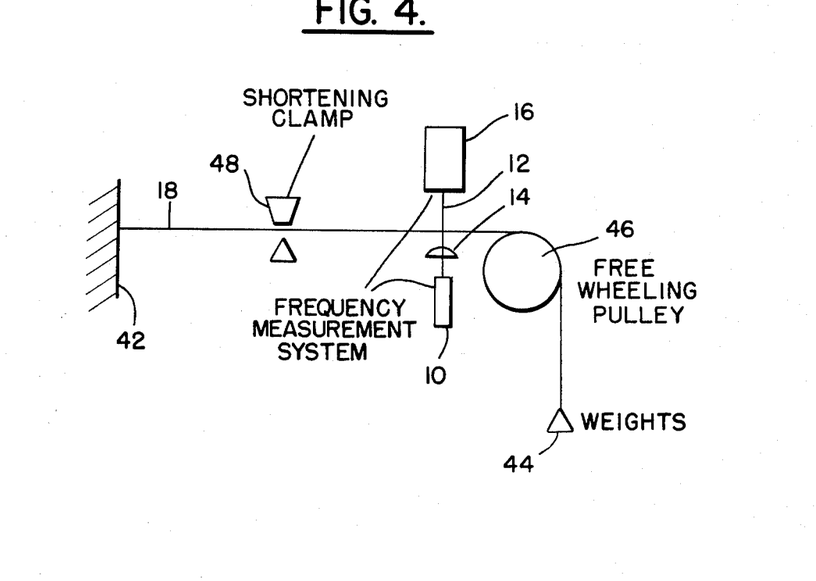
FIG. 4 is a schematic diagram of an experimental set-up used to measure tension in a stationary optical waveguide fiber.

The experimental set-up which was used is shown in FIG. 4. One end of optical waveguide fiber 18 was attached to weight 44, and the fiber was then strung over free wheeling pulley 46 and attached to fixed pole 42. The fiber employed in these tests was a finished, coated fiber, having a mass per unit length of approximately 0.72 mg/cm. The length of the fiber between pole 42 and the top of pulley 46 was 390.4 cm. Clamp 48 was used to shorten the fiber length to 191 cm and thus increase the fiber's fundamental frequency, namely the first harmonic, for a given level of tension as seen from Eq. 3.

The optical system of FIG. 1 was set in place so that laser beam 12 illuminated the fiber and the shadow of the fiber fell on the photodiode array of RETICON 16. Recording and analysis of the motion of the fiber was performed as described above in Example 1. Vibration was introduced into the fiber by blowing on the fiber before each measurement.

Figure 5:
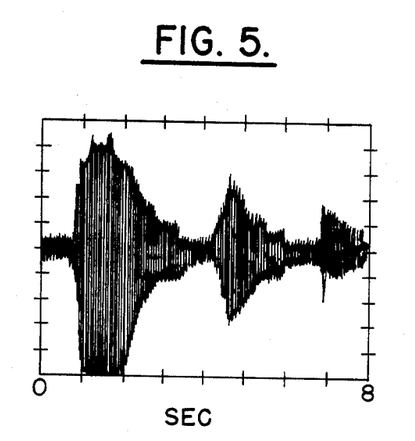
FIG. 5 shows typical position versus time waveforms produced by the electronics section of FIG. 2 when used with the experimental set-up of FIG. 4.
Figure 6:
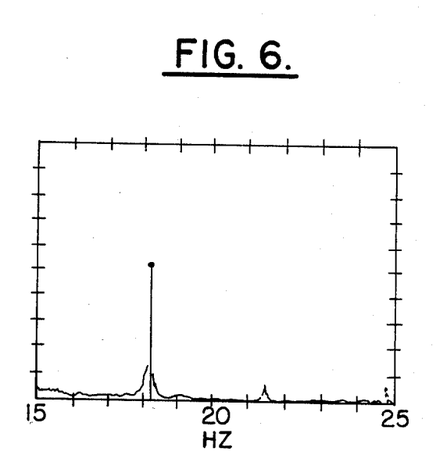
FIG. 6 shows the frequency components of the waveforms of FIG. 5 as determined by a spectrum analyzer.

FIG. 5 shows a typical position versus time waveform for three excitations of the fiber. FIG. 6 shows the frequency spectrum for this data as determined by the spectrum analyzer.

Table 1 reports the fundamental frequencies observed for various applied tensions for both the 390.4 cm and 191.0 cm fiber lengths. The last two columns of the table show the tensions calculated from Eq. 3 using the measured fundamental frequencies, the measured fiber lengths, and the fiber mass per unit length value given above.

Comparing the last two columns with the first column shows that the calculated fiber tensions for the longer fiber are between three and four percent above the actual applied tension, while for the short fiber, they are between one and three percent high. These errors, at least in part, are believed to be the result of errors in measurement of the various constants used in Eq. 3, in particular, in the value of the fiber's mass per unit length. An error of 1% in the value of this constant will lead to an equal percentage error in tension. It should be noted that as the value of tension increases, the accuracy of the system decreases. This results from the radical in Eq. 3, which means that for a given uncertainty in frequency, at higher tensions, a higher uncertainty in tension is present.

A repeatability study for the experimental set-up of FIG. 4 showed that the observed fundamental frequencies had a repeatability of ±0.1 hertz, which corresponds to approximately 1% repeatability in the tension values.

As discussed above, during drawing, the fiber is not actually rigidly clamped at both ends, but is damped by viscous flow in the hot zone and in the coater. Also, the diameter of the fiber varies significantly in the region of the root of the preform thus producing a non-constant mass per unit length at the top end of the fiber. To test the effects of these departures from the assumptions underlying Eq. 3, two tests were performed.

In one, the fiber was run through a container of fluid having a viscosity of approximately 200 poise. The frequency reaction, within the measurement errors of the system, was as if the fiber had been rigidly clamped at the edge of the fluid. In the second test, a small lump of clay was attached to one end of the fiber to simulate the increased mass per unit length which occurs at the root of a preform as will be understood in the art. As long as the clay was kept adjacent to the end of the fiber, no noticeable effect on the measured fundamental frequency was observed.

In sum, the experiments of this example show that tension in an optical waveguide fiber can be monitored by monitoring the fundamental frequency of vibration of the fiber, and indeed, to within a few percent, an accurate estimate of the tension in the fiber can be calculated from the frequency data by means of Eq. 3.

EXAMPLE 3

Monitoring of Tension in an Optical Waveguide Fiber During Drawing

This example reports the results of a series of experiments which were performed on an optical waveguide fiber during drawing to establish that harmonic analysis of the transverse vibrational motion of a fiber can be used to monitor the tension in the fiber.

The experiments were performed using a standard optical waveguide drawing tower under the feedback control of an interferometric diameter monitoring (IDM) system. Tension was monitored in the region between the furnace and the first coating station. The level of tension within the fiber was varied by changing either or both of the fiber draw speed and the temperature of the furnace used to heat the preform. As is known in the art, for a constant furnace temperature, tension varies linearly with fiber draw speed. See, for example, U. C. Paek, "Optical Fibers Coated with a UV-Curable Material at a Speed of 12 M/Sec," *Electronic Letters*, Vol. 20, No. 7, pp. 304–305, Mar. 29, 1984. As is also known in the art, an increased furnace temperature reduces fiber tension.

For draw speeds below 2 meters/second, both the frequency method of the present invention and the prior art contact method were used to measure fiber tension. Specifically, fiber tension was measured first using the apparatus of Example 1 and then the three wheel device was brought into contact with the fiber, and the tension was measured again. In most cases, the fiber drawing process introduced enough vibrational energy into the fiber to allow the fundamental frequency to be measured using the optical and electronic systems of FIGS. 1 and 2. In some cases, however, it was necessary to blow on the fiber to increase the excitation level of the fundamental frequency.

With regard to the three wheel measurements, it was found that contact of the three wheel device with the fiber consistently reduced the draw speed of the fiber. This speed reduction was traced to a change in the path of the fiber with respect to the IDM caused by the passage of the fiber through the three wheel device. Because draw speed and tension are linearly related, this reduced speed manifested itself as reduced tension values for the three wheel device as compared to the tension values calculated from the fiber's fundamental frequency.

For draw speeds above 2 meters/second, only the apparatus of the present invention was used to monitor tension since the three wheel device consistently broke the fiber before a steady state tension measurement could be made.

Figure 7:
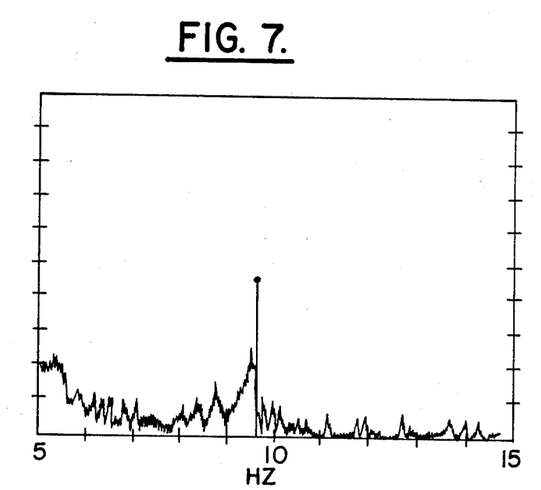
FIG. 7 shows a typical frequency spectrum which was obtained during the drawing of an optical waveguide fiber using the apparatus of the present invention.

FIG. 7 shows a typical spectrum obtained with the apparatus of Example 1 during the drawing of an optical waveguide fiber. Comparing FIG. 7 with FIG. 6 reveals that the spectrum measured during drawing includes noise induced broadening of the fundamental frequency. It is believed that, among other sources, these changes result from fluctuations in fiber velocity introduced by the IDM. Overall, however, FIG. 7 clearly demonstrates that the frequency peaks of interest are discernible from the draw noise.

Table 2 lists comparative tension measurements for furnace temperatures varying between 2110° C. and 2150° C. and for draw speeds below 2 meters/sec obtained with the apparatus of the present invention, as seen from the column labeled "Calculated Tension," and with the three wheel device, as seen from the column labeled "Measured Tension". The approximate mass per unit length value of 0.3 mg/cm was used in calculating the tension from the measured fundamental frequencies. The free length of the fiber before the first coater was 487.7 cm. Because of the reduction in fiber speed which occurs when the contact method is used, the tension values obtained using that method are generally lower than those calculated from the measured fundamental frequency.

Table 3 illustrates the use of the harmonic analysis technique to monitor the tension in fibers being drawn at speeds above 2 meters/second. The furnace temperature for these runs was 2150° C. and the free length of fiber before the first coater was 363.2 cm. As noted above, corresponding data for the contact method could not be obtained at these higher speeds because of fiber breakage.

Figure 8:
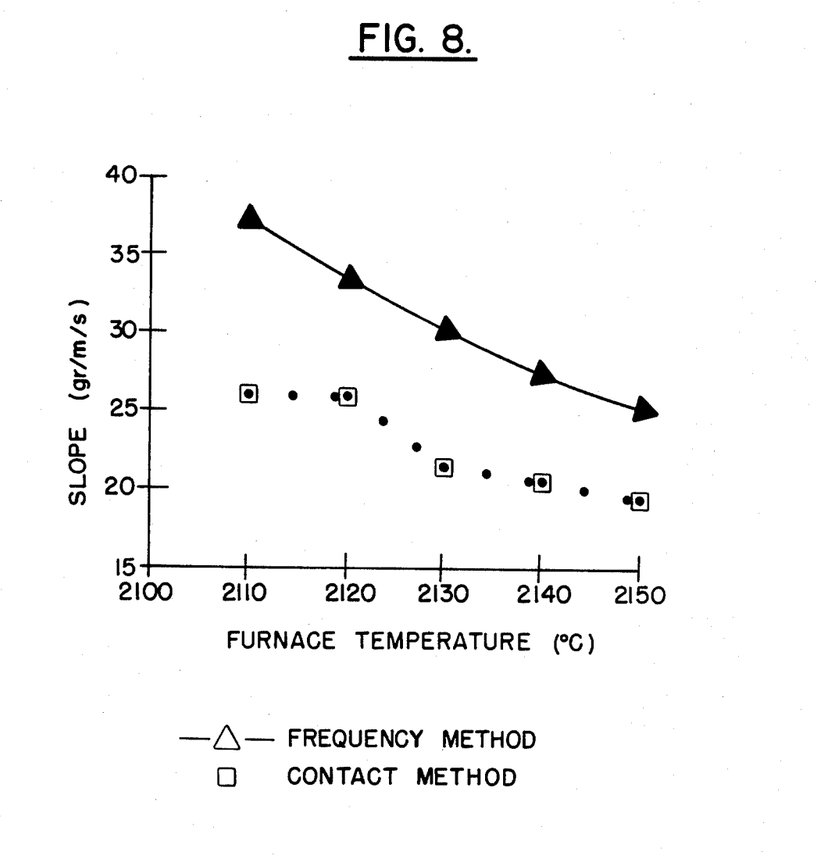
FIG. 8 is a graph of the slopes determined from linear regression fits to the data given in Table 2 versus furnace temperature.

As discussed above, for a constant furnace temperature, draw speed and tension are linearly related. Moreover, since stress is equal to viscosity times strain rate, the viscosity of the heated portion of the preform can be estimated from the slope of a straight line fit to the tension versus draw speed data. As a further confirmation that harmonic analysis of the transverse vibrational motion of an optical waveguide fiber can be used to monitor fiber tension, linear regression fits were performed on the data of Table 2, that is, one fit for each furnace temperature, and the slopes of the resulting straight lines were determined and plotted against furnace temperature. The results for both the fundamental frequency and three wheel approaches are shown in FIG. 8. As expected, for both measurement methods, the slope, i.e., the preform viscosity decreases as the furnace temperature increases.

The linear regression fits were also used to estimate the accuracy of the frequency method for monitoring fiber tension. Specifically, the linear regression fits were assumed to be accurate and the deviations between those fits and the values actually measured at each data point in Table 2 were determined.

The results are shown in Table 4, where the column labeled "Measured Tension" gives the value of tension experimentally determined using the frequency method, and the column labeled "Regression Tension" gives the value of tension predicted for that data point by the linear regression fit. The average standard deviation of the measured tension from the regression tension was found to be about 8%.

This deviation is believed to result primarily from errors in determining the value of the fundamental frequency due to noise induced broadening of the frequency spectrum generated by the spectrum analyzer. If desired, the deviation can be improved in various ways, such as, by reducing the intrinsic noise of the drawing process, by using computer aided peak picking routines to more accurately determine the fiber's fundamental frequency, and by averaging multiple independent measurements of the fundamental frequency. Of course, taking more measurements will increase the response time of the system. For example, for the experiments described above, eight seconds of position versus time data were typically fed to the spectrum analyzer. Thus, for five independent measurements, a total of forty seconds of data would be required. For certain applications, such as adjusting furnace temperature, a forty second response time would be acceptable. For other applications, shorter response times may be necessary and thus other approaches to improving the accuracy of the system may have to be used.

Although specific embodiments of the invention have been described and illustrated, it is to be understood that modifications can be made without departing from the invention's spirit and scope. For example, rather than being designed as a separate unit, the tension monitoring system of the present invention could be integrated with existing control systems, e.g., X-Y position detecting systems, used in the drawing of optical waveguide fibers. Other modifications to the invention will be readily apparent to persons skilled in the art from the foregoing disclosure.

TABLE 1

| Applied Tension (gr) | Frequency (Hz) L = 390.4 cm | Frequency (Hz) L = 191.0 cm | Calculated Tension (gr) L = 390.4 cm | Calculated Tension (gr) L = 191.0 cm |
|---|---|---|---|---|
| 19.98 | 6.800 | 13.750 | 20.7 | 20.3 |
| 40.12 | 9.650 | 19.500 | 41.7 | 40.8 |
| 70.10 | 12.700 | 25.750 | 72.2 | 71.1 |
| 90.24 | 14.400 | 29.125 | 92.9 | 90.9 |
| 120.17 | 16.625 | 33.625 | 123.8 | 121.2 |
| 140.31 | 18.000 | 36.625 | 145.1 | 143.8 |
| 170.29 | 19.750 | 40.125 | 174.7 | 172.6 |
| 190.43 | 21.000 | 42.500 | 197.5 | 193.6 |

TABLE 2

| Fiber Velocity (m/s) | Furnace Temp (°C.) | Measured Frequency (Hz) | Measured Tension (gr) | Calculated Tension (gr) |
|---|---|---|---|---|
| 0.50 | 2150 | 6.050 | 10.0 | 10.7 |
| 0.60 | 2150 | 6.650 | 12.0 | 12.9 |
| 0.70 | 2150 | 7.200 | 14.0 | 15.1 |
| 0.80 | 2150 | 7.750 | 17.0 | 17.5 |
| 0.90 | 2150 | 8.650 | 19.0 | 21.8 |
| 1.00 | 2150 | 8.450 | 21.0 | 20.8 |
| 1.10 | 2150 | 9.450 | 23.0 | 26.0 |
| 1.20 | 2150 | 10.100 | 24.0 | 29.7 |
| 1.30 | 2150 | 9.800 | 26.0 | 28.0 |
| 1.50 | 2150 | 11.175 | 29.0 | 36.4 |
| 1.60 | 2150 | 11.500 | 32.0 | 38.5 |
| 0.50 | 2140 | 6.250 | 10.0 | 11.4 |
| 0.60 | 2140 | 6.750 | 12.5 | 13.3 |
| 0.70 | 2140 | 7.250 | 14.0 | 15.3 |
| 0.80 | 2140 | 8.500 | 16.0 | 21.0 |
| 0.90 | 2140 | 8.875 | 18.0 | 22.9 |
| 1.00 | 2140 | 9.125 | 20.0 | 24.2 |
| 1.10 | 2140 | 9.250 | 23.0 | 24.9 |
| 1.20 | 2140 | 10.250 | 25.0 | 30.6 |
| 1.30 | 2140 | 10.625 | 27.0 | 32.9 |
| 1.40 | 2140 | 11.375 | 29.0 | 37.7 |
| 1.50 | 2140 | 11.375 | 31.0 | 37.7 |
| 1.90 | 2140 | 13.000 | 38.0 | 49.2 |
| 0.50 | 2130 | 6.375 | 11.0 | 11.8 |
| 0.70 | 2130 | 7.250 | 15.0 | 15.3 |
| 0.80 | 2130 | 8.500 | 17.7 | 21.0 |
| 0.90 | 2130 | 9.500 | 20.0 | 26.3 |
| 1.00 | 2130 | 9.625 | 22.0 | 27.0 |
| 1.10 | 2130 | 10.125 | 24.8 | 29.9 |
| 1.20 | 2130 | 10.000 | 27.0 | 29.1 |
| 1.50 | 2130 | 12.750 | 34.0 | 47.3 |
| 1.90 | 2130 | 13.250 | 40.0 | 51.1 |
| 0.50 | 2120 | 6.750 | 11.5 | 13.3 |
| 0.60 | 2120 | 7.500 | 14.0 | 16.4 |
| 0.70 | 2120 | 8.100 | 16.0 | 19.1 |
| 0.90 | 2120 | 9.500 | 21.7 | 26.3 |
| 1.00 | 2120 | 10.500 | 24.3 | 32.1 |
| 1.20 | 2120 | 11.500 | 28.0 | 38.5 |
| 1.40 | 2120 | 10.750 | 33.5 | 33.7 |
| 1.60 | 2120 | 13.750 | 41.0 | 55.1 |

TABLE 2-continued

| Fiber Velocity (m/s) | Furnace Temp (°C.) | Measured Frequency (Hz) | Measured Tension (gr) | Calculated Tension (gr) |
|---|---|---|---|---|
| 0.60 | 2110 | 8.000 | 15.7 | 18.6 |
| 0.70 | 2110 | 8.550 | 18.0 | 21.3 |
| 0.83 | 2110 | 8.875 | 21.5 | 22.9 |
| 0.90 | 2110 | 10.875 | 24.0 | 34.4 |
| 1.00 | 2110 | 10.625 | 27.0 | 32.9 |
| 1.20 | 2110 | 11.750 | 30.0 | 40.2 |
| 1.40 | 2110 | 11.750 | 37.0 | 40.2 |

TABLE 3

| Fiber Length (cm) | Fiber Velocity (m/s) | Measured Frequency (Hz) | Calculated Tension (gr) |
|---|---|---|---|
| 363.2 | 0.32 | 6.050 | 6.1 |
| 363.2 | 1.00 | 11.650 | 22.5 |
| 363.2 | 1.95 | 16.875 | 47.3 |
| 363.2 | 2.11 | 17.500 | 50.8 |
| 363.2 | 2.50 | 18.625 | 57.6 |
| 363.2 | 3.20 | 21.000 | 73.2 |
| 363.2 | 3.50 | 22.125 | 81.3 |
| 363.2 | 4.00 | 23.750 | 93.6 |
| 363.2 | 4.30 | 24.500 | 99.7 |
| 363.2 | 4.61 | 25.250 | 105.9 |
| 363.2 | 5.00 | 25.750 | 110.1 |
| 363.2 | 5.00 | 26.250 | 114.4 |
| 363.2 | 5.35 | 26.500 | 116.6 |
| 363.2 | 5.55 | 28.500 | 134.9 |
| 363.2 | 5.78 | 27.750 | 127.8 |
| 363.2 | 5.91 | 27.500 | 125.6 |
| 363.2 | 6.20 | 27.750 | 127.8 |
| 363.2 | 6.35 | 28.750 | 137.2 |
| 363.2 | 6.70 | 28.750 | 137.2 |
| 363.2 | 7.00 | 29.250 | 142.0 |
| 363.2 | 7.12 | 29.500 | 144.5 |
| 363.2 | 7.67 | 30.250 | 151.9 |

TABLE 4

| Fiber Velocity (m/s) | Furnace Temp. (°C.) | Measured Frequency (Hz) | Measured Tension (gr) | Regression Tension (gr) |
|---|---|---|---|---|
| 0.50 | 2150 | 6.050 | 10.7 | 10.3 |
| 0.60 | 2150 | 6.650 | 12.9 | 12.8 |
| 0.70 | 2150 | 7.200 | 15.1 | 15.3 |
| 0.80 | 2150 | 7.750 | 17.5 | 17.9 |
| 0.90 | 2150 | 8.650 | 21.8 | 20.4 |
| 1.00 | 2150 | 8.450 | 20.8 | 22.9 |
| 1.10 | 2150 | 9.450 | 26.0 | 25.5 |
| 1.20 | 2150 | 10.100 | 29.7 | 28.0 |
| 1.30 | 2150 | 9.800 | 28.0 | 30.5 |
| 1.50 | 2150 | 11.175 | 36.4 | 35.6 |
| 1.60 | 2150 | 11.500 | 38.5 | 38.1 |
| 0.50 | 2140 | 6.250 | 11.4 | 11.0 |
| 0.60 | 2140 | 6.750 | 13.3 | 13.7 |
| 0.70 | 2140 | 7.250 | 15.3 | 16.5 |
| 0.80 | 2140 | 8.500 | 21.0 | 19.2 |
| 0.90 | 2140 | 8.875 | 22.9 | 22.0 |
| 1.00 | 2140 | 9.125 | 24.3 | 24.7 |
| 1.10 | 2140 | 9.250 | 24.9 | 27.5 |
| 1.20 | 2140 | 10.250 | 30.6 | 30.2 |
| 1.30 | 2140 | 10.625 | 32.9 | 32.9 |
| 1.40 | 2140 | 11.375 | 37.7 | 35.7 |
| 1.50 | 2140 | 11.375 | 37.7 | 38.4 |
| 1.90 | 2140 | 13.000 | 49.2 | 49.4 |
| 0.50 | 2130 | 6.375 | 11.8 | 11.7 |
| 0.70 | 2130 | 7.250 | 15.3 | 17.7 |
| 0.80 | 2130 | 8.500 | 21.0 | 20.7 |
| 0.90 | 2130 | 9.500 | 26.3 | 23.8 |
| 1.00 | 2130 | 9.625 | 27.0 | 26.8 |
| 1.10 | 2130 | 10.125 | 29.9 | 29.8 |
| 1.20 | 2130 | 10.000 | 29.1 | 32.8 |
| 1.50 | 2130 | 12.750 | 47.3 | 41.8 |
| 1.90 | 2130 | 13.250 | 51.1 | 53.8 |
| 0.50 | 2120 | 6.750 | 13.3 | 13.1 |
| 0.60 | 2120 | 7.500 | 16.4 | 16.4 |
| 0.70 | 2120 | 8.100 | 19.1 | 19.7 |

TABLE 4-continued

| Fiber Velocity (m/s) | Furnace Temp. (°C.) | Measured Frequency (Hz) | Measured Tension (gr) | Regression Tension (gr) |
|---|---|---|---|---|
| 0.90 | 2120 | 9.500 | 26.3 | 26.4 |
| 1.00 | 2120 | 10.500 | 32.1 | 29.7 |
| 1.20 | 2120 | 11.500 | 38.5 | 36.4 |
| 1.40 | 2120 | 10.750 | 33.7 | 43.0 |
| 1.60 | 2120 | 13.750 | 55.1 | 49.7 |
| 0.60 | 2110 | 8.000 | 18.6 | 17.3 |
| 0.70 | 2110 | 8.550 | 21.3 | 21.0 |
| 0.83 | 2110 | 8.875 | 22.9 | 25.9 |
| 0.90 | 2110 | 10.875 | 34.4 | 28.5 |
| 1.00 | 2110 | 10.625 | 32.9 | 32.2 |
| 1.20 | 2110 | 11.750 | 40.2 | 39.6 |
| 1.40 | 2110 | 11.750 | 40.2 | 47.0 |

What is claimed is:

1. A method for monitoring the tension in a moving fiber comprising the steps of:
   (a) sensing the motion of the fiber in a direction transverse to the direction in which the fiber is moving;
   (b) analyzing the sensed motion to determine at least one frequency component thereof, said analysis including performing a Fourier transform to determine said at least one frequency component of the sensed motion of the fiber; and
   (c) monitoring the frequency component so determined so as to monitor the tension in the fiber.

2. The method of claim 1 wherein the motion of the fiber is sensed optically.

3. The method of claim 2 wherein the motion of the fiber is sensed by illuminating the fiber and sensing the location of its shadow as a function of time.

4. The method of claim 3 wherein the fiber is illuminated by a laser beam and the location of the fiber's shadow is sensed on a linear array of photodiodes.

5. The method of claim 4 wherein the fiber is illuminated by passing a laser beam through a cylindrical lens.

6. The method of claim 1 wherein the fiber is illuminated by a laser beam and the location of the fiber's shadow is sensed on a linear array of photodiodes and wherein the lowest frequency component determined by the Fourier transform is monitored, said lowest frequency component being approximately proportional to the square root of the tension in the fiber.

7. The method of claim 1 wherein the lowest frequency component determined by the Fourier transform is monitored, said lowest frequency component being approximately proportional to the square root of the tension in the fiber.

8. Apparatus for monitoring the tension in a moving fiber comprising:
   (a) means for sensing the motion of the fiber in a direction transverse to the direction in which the fiber is moving;
   (b) means for analyzing the sensed motion to determine at least one frequency component thereof, said means performing a Fourier transform to determine said at least one frequency component of the sensed motion of the fiber; and
   (c) means for monitoring the frequency component so determined so as to monitor the tension in the fiber.

9. The apparatus of claim 8 wherein the means for sensing the motion of the fiber is optical means.

10. The apparatus of claim 9 wherein the means for sensing the motion of the fiber includes means for illuminating the fiber and means for sensing the location of the fiber's shadow.

11. The apparatus of claim 10 wherein the means for illuminating includes a laser and the means for sensing the location of the fiber's shadow includes a linear array of photodiodes.

12. The apparatus of claim 11 wherein the means for illuminating includes a cylindrical lens for increasing the cross-sectional area of the laser beam so that all of the photodiodes in the array are illuminated.

13. The apparatus of claim 8 wherein the means for monitoring monitors the lowest frequency component determined by the Fourier transform, said lowest frequency component being approximately proportional to the square root of the tension in the fiber.

14. The apparatus of claim 10 wherein the means for illuminating includes a laser, the means for sensing the location of the fiber's shadow includes a linear array of photodiodes, and the means for monitoring monitors the lowest frequency component determined by the Fourier transform, said lowest frequency component being approximately proportional to the square root of the tension in the fiber.

15. Apparatus for monitoring the tension in a moving fiber comprising:
 (a) a laser for illuminating a portion of the moving fiber;
 (b) means for sensing the motion of the illuminated portion of the fiber as a function of time, said means including a linear array of photodiodes, the array being illuminated by the laser, and the laser, the array and the fiber being positioned relative to one another so that the fiber casts a shadow on the array;
 (c) means for performing a Fourier transform on the sensed motion of the illuminated portion of the fiber to determine at least one frequency component of said motion; and
 (d) means for monitoring the frequency component so determined so as to monitor the tension in the fiber.

16. The apparatus of claim 15 wherein the means for monitoring monitors the lowest frequency component determined by the Fourier transform, said lowest frequency component being approximately proportional to the square root of the tension in the fiber.

* * * * *